No. 713,091. Patented Nov. 11, 1902.
T. A. GILLESPIE.
LOCK BAR PIPE.
(Application filed Aug. 7, 1902.)
(No Model.)
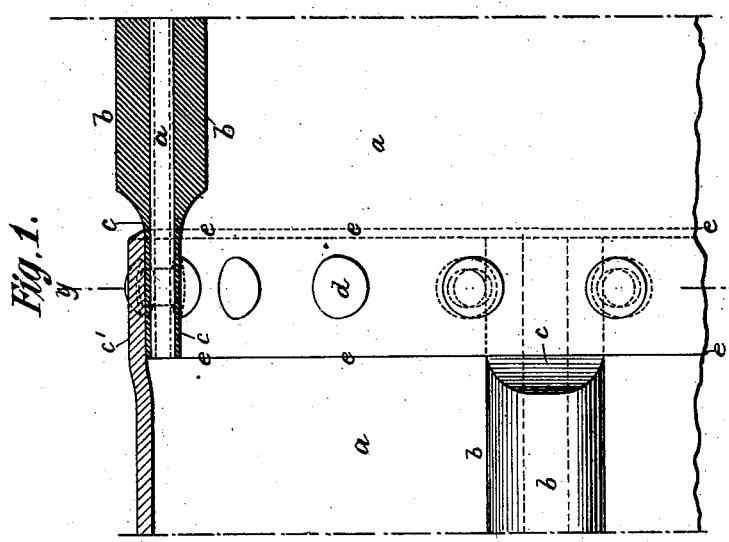
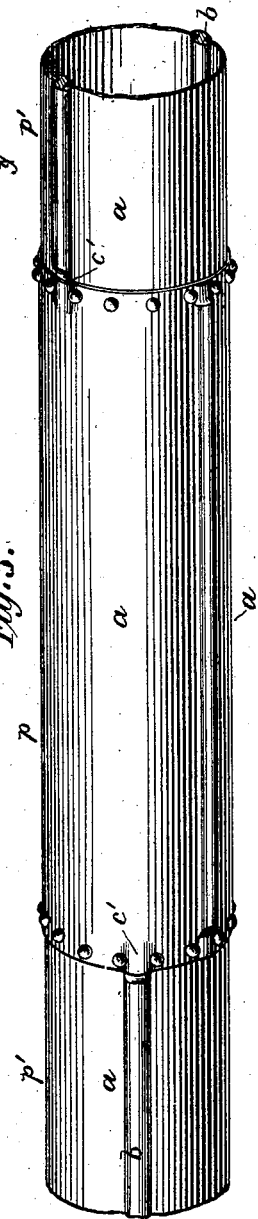
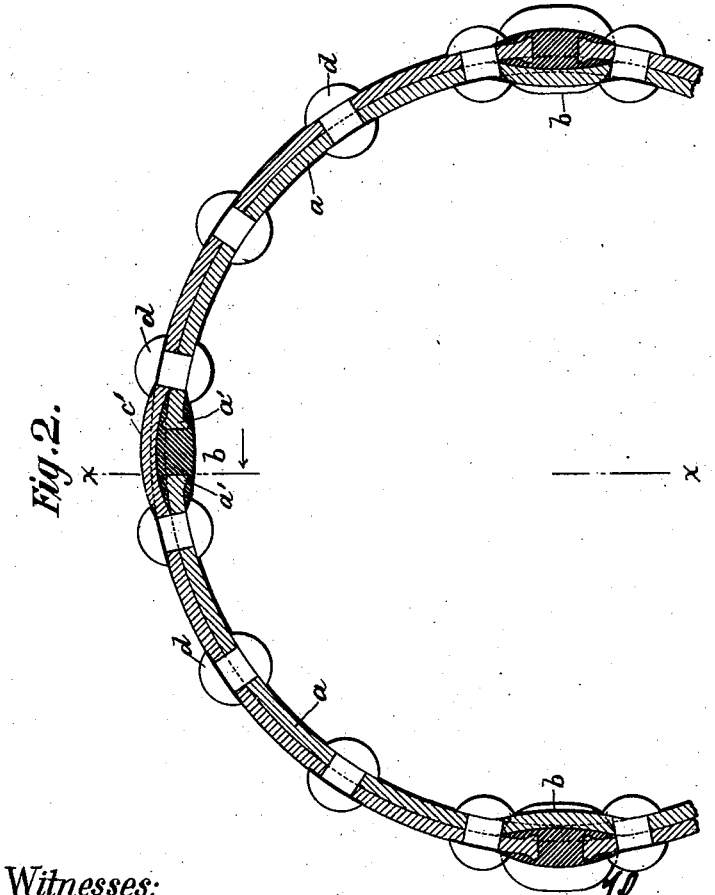
Witnesses: Raphael Netter, Thos. J. Byrnes
Thomas A. Gillespie, Inventor
by Kerr Page & Cooper, Att'ys

UNITED STATES PATENT OFFICE.

THOMAS A. GILLESPIE, OF WEST ORANGE, NEW JERSEY.

LOCK-BAR PIPE.

SPECIFICATION forming part of Letters Patent No. 713,091, dated November 11, 1902.

Application filed August 7, 1902. Serial No. 118,699. (No model.)

*To all whom it may concern:*

Be it known that I, THOMAS A. GILLESPIE, a citizen of the United States, residing at West Orange, in the county of Essex and State of New Jersey, have invented certain new and useful Improvements in Lock-Bar Pipes, of which the following is a specification, reference being had to the drawings accompanying and forming part of the same.

My invention consists in an improved joint for connecting the ends of lock-bar pipes. Such pipes are composed of two or more longitudinal plates of steel having their edges upset to form a laterally-expanded rim, usually of dovetail shape, and the plates are connected together by longitudinal bars having grooves in which the upset edges are secured by compression, so as to form a tight union of the several parts. The lock-bars are relatively much thicker than the plates, and their sides project along the inner and outer sides of the completed pipe. The advantages of lock-bar over ordinary riveted pipe consist in the avoidance of riveted longitudinal seams between the edges of the plates, which weaken the pipe, and in the fact that they can be made in long sections, the usual length of a section being about thirty feet, while an ordinary riveted pipe-section is made up of several plates which vary in length from four to eight feet, according to the diameter of the pipe, and the lessening of friction by the great reduction of the number of transverse joints and the substitution of smooth lock-bars for the lines of longitudinal rivets. A serious objection, however, to the use of lock-bar pipes is the expense and difficulty of connecting the sections to each other, and it has been customary to do this by means of metal sleeves having a calking groove or recess at each end which requires to be calked with lead. These sleeves are made with folds or bends which extend over the externally-projecting lock-bars and add to the expense and difficulty of making and calking them. The pipes are very large, running from thirty inches in diameter up to much larger sizes, and the sleeves not only require a large amount of metal, but have to be made with great care, while the operation of calking them requires a high degree of skill. The amount of lead required for the calking is so considerable as to add largely to the expense of using them. Moreover, a joint so made is relatively weak, which is a serious objection in case of long pipe-lines, where the amount of expansion and contraction is considerable, in that it tends to displace or loosen the lead or other packing and cause leaky joints. My improvement is designed to obviate these difficulties and to afford a cheaper, simpler, and stronger joint between the pipe-sections.

To enable others skilled in the art to make and use my improvement, I will now describe it by reference to the accompanying drawings, in which—

Figure 1 is a longitudinal view, partly in section, on the line $x$ $x$ of Fig. 2 of my improved pipe-joint. Fig. 2 is a cross-section on the line $y$ $y$ of Fig. 1. Fig. 3 is a perspective view of a portion of a pipe-line the sections of which are connected together by my improved joint.

Each section of the pipe is composed of two or more longitudinal plates $a$, the edges of which are upset into an approximately dovetail shape $a'$. The plates are joined together by lock-bars $b$, having grooved edges which contain the dovetails $a'$ of the plates $a$. The overlapping edges of the lock-bars are pinched or upset around the dovetails $a'$ of the plates. In ordinary lock-bar pipe the thick lock-bars extend to the ends of the pipe-sections; but in making my improved joint I plane off or otherwise reduce the ends of the lock-bars, as shown at $c$, for some distance back from the end of the pipe-section to a total thickness of a little greater than the thickness of the dovetails $a'$. Each alternate section $p$ of the pipe is made of a diameter slightly greater than the adjacent sections $p'$, so that the ends of the adjacent sections $p'$ may be inserted into the section $p$ for the purpose of being riveted therein, and at the points where the reduced ends of the locking-bars occur the pipes are bent or grooved, as at $c'$, for the purpose of receiving the reduced ends of the external surface of the lock-bars. The ends of the sections $p'$ are inserted into the ends of the sections $p$, as plainly shown in Figs. 1 and 3, a sufficient distance to afford a good riveting-surface, and then the overlapping ends are secured together by rivets $d$. After the ends are so riveted the edges of the plates along the lines *e e* are upset or milled by means of a pneumatic tool or chisel for the purpose of making a tight joint, as will be understood. The sections of the pipe are so placed that the locking-bars of successive sections do not come in line. By this means I get rid of the costly and troublesome sleeve and the lead calking, the latter alone costing more than the rivets I use, and make a much simpler, cheaper, and stronger joint. In short, I overcome the most serious objection that has been found to the use of lock-bar pipe over the short-section riveted pipe formerly used—namely, the difficulty and expense heretofore experienced in properly uniting the sections to each other. The presence of the ends of the lock-bars in the ends of the adjacent sections of pipe greatly strengthens the joint and stiffens the pipe-line, rendering it more durable while being laid or when subjected to lateral strain.

If desired, instead of making the alternate sections of the pipe of different diameters each section may be made sufficiently tapered to permit the smaller end to enter and be riveted to the larger end of the adjacent section.

My invention is applicable to lock-bar pipes made of sections composed of single plates the edges of which are united by a single lock-bar, and I mean to so claim it.

What I claim as my invention is—

1. A lock-bar-pipe joint, in which the outer ends of the lock-bars of one section are reduced and inserted into the end of the other section and said sections are riveted together, substantially as and for the purposes described.

2. A pipe-line for lock-bar pipe, having the sections united by rivets with the ends of the lock-bars of the sections extending into the ends of adjoining sections, substantially as and for the purposes described.

THOMAS A. GILLESPIE.

Witnesses:
  THOS. D. HARRIS,
  Z. ROSENFIELD.